US012783708B2

(12) United States Patent
Rengasamy et al.

(10) Patent No.: US 12,783,708 B2
(45) Date of Patent: Nov. 3, 2026

(54) CONTROLLING ACCESS TO BACKUP COPIES FROM AN APPLICATION HOST

(71) Applicant: Dell Products L.P., Round Rock, TX (US)

(72) Inventors: Karimuthu Rengasamy, Lafayette, CO (US); Arun Kumar P, Bangalore (IN); Ryan Finazzo, Yorba Linda, CA (US); Abhidnya Joshi, Pune (IN); Piyush Tambekar, Pune (IN); Senthil Ponnuswamy, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 117 days.

(21) Appl. No.: 18/990,575

(22) Filed: Dec. 20, 2024

(65) Prior Publication Data

US 2026/0178761 A1 Jun. 25, 2026

(51) Int. Cl.
*G06F 21/62* (2013.01)
*G06F 11/1446* (2026.01)

(52) U.S. Cl.
CPC ...... *G06F 21/6218* (2013.01); *G06F 11/1458* (2013.01); *G06F 2201/80* (2013.01)

(58) Field of Classification Search
None
See application file for complete search history.

(56) References Cited

U.S. PATENT DOCUMENTS

| | | | | |
|---|---|---|---|---|
| 8,042,172 | B1 * | 10/2011 | Heithcock | G06F 11/1466 707/674 |
| 10,740,022 | B2 * | 8/2020 | Gutta | G06F 13/1668 |
| 2008/0256314 | A1 * | 10/2008 | Anand | G06F 11/1451 711/162 |
| 2012/0011562 | A1 * | 1/2012 | Slater | G06F 21/805 726/1 |
| 2022/0066670 | A1 * | 3/2022 | Naik | G06F 3/0641 |
| 2024/0143759 | A1 * | 5/2024 | Jindal | G06F 21/568 |

* cited by examiner

*Primary Examiner* — Raqiul A Choudhury
(74) *Attorney, Agent, or Firm* — Staniford Tomita LLP

(57) ABSTRACT

A data protection agent is installed on an application host having an asset, desktop application, and agent. The agent backs up the asset to and restores the asset from a data protection appliance. Access by a user to the host is granted by an application server administrator. The agent is registered with the appliance. The appliance is managed by a backup administrator that defines access control policies to backup copies of the asset. Upon the user logging into and being validated at the host, the agent receives a request from the desktop application indicating that the user wishes to access a backup copy. A determination is made as to whether the user is allowed access. If the user is not allowed access according to the access control policies, the request is blocked despite the user having been validated at the host.

18 Claims, 7 Drawing Sheets

CONTROLLING ACCESS TO BACKUP COPIES FROM AN APPLICATION HOST

TECHNICAL FIELD

The present invention relates generally to information processing systems, and more particularly to large scale filesystems.

BACKGROUND

In today's information technology (IT) landscape, ensuring data recovery is paramount for maintaining business continuity and mitigating the risks associated with data loss. There is a need for improved systems and techniques to handle the complexities of managing data recovery procedures efficiently. There is a need to empower backup administrators to centrally oversee backup copies for protected assets and grant application server administrators and restore administrators the ability to execute data recovery tasks from a centralized platform and direct self-service restores on application servers such as Microsoft SQL server, Oracle, and others—while also controlling access to backup copies.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY

A data protection agent is installed on an application host having an asset, desktop application, and agent. The agent backs up the asset to and restores the asset from a data protection appliance. Access by a user to the host is granted by an application server administrator. The agent is registered with the appliance. The appliance is managed by a backup administrator that defines access control policies to backup copies of the asset. Upon the user logging into and being validated at the host, the agent receives a request from the desktop application indicating that the user wishes to access a backup copy. A determination is made as to whether the user is allowed access. If the user is not allowed access according to the access control policies, the request is blocked despite the user having been validated at the host.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
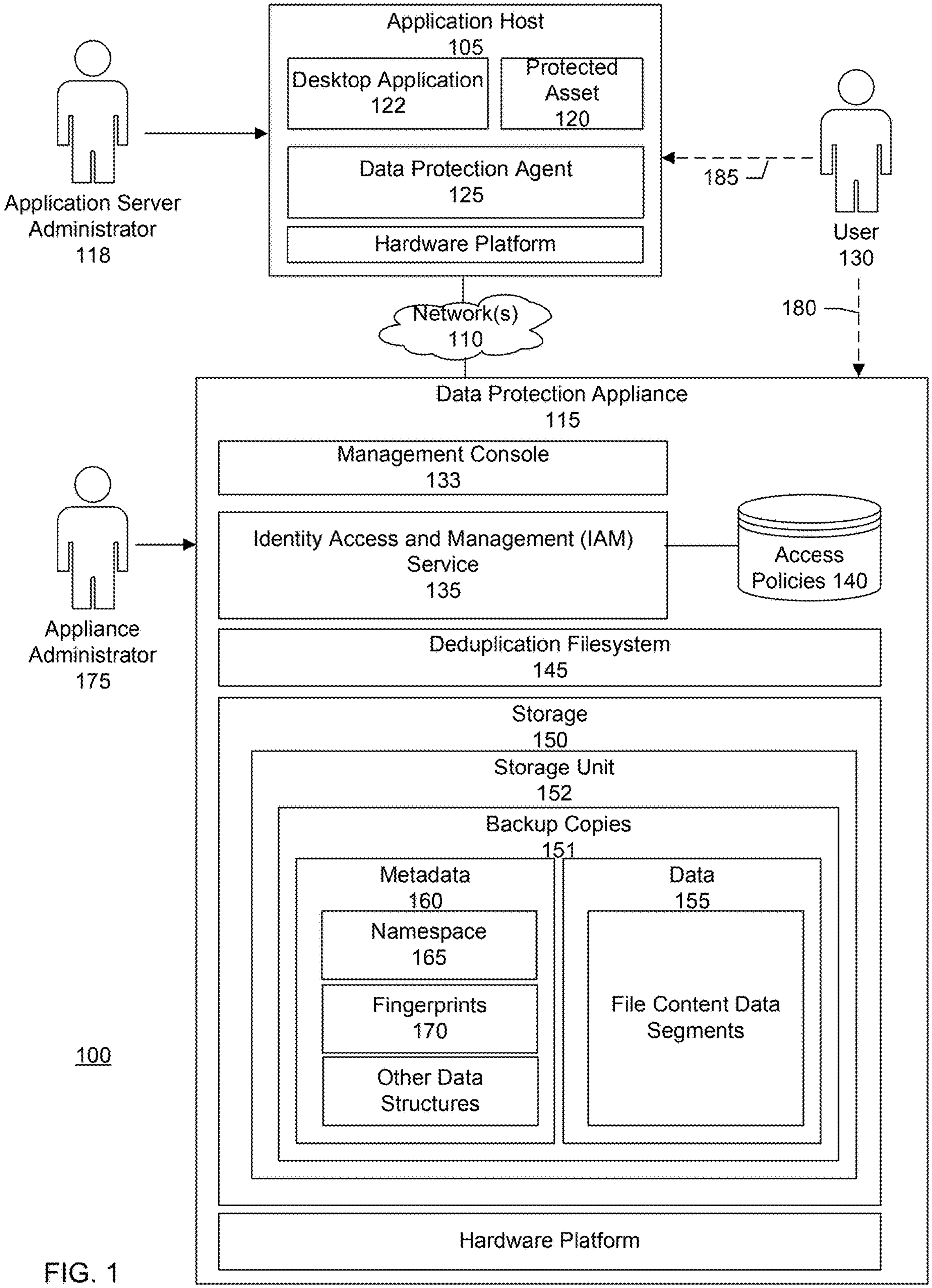
FIG. 1 shows a block diagram of an information processing system for controlling access to backup copies from an application host, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. A particular computer system may act as both a client or a server depending on whether the computer system is requesting or providing information. In this disclosure, the variable N and other similar index variables are assumed to be arbitrary positive integers greater than or equal to two. It should be appreciated that the blocks, components, and modules shown in the figures may be functional and there can be many different hardware configurations, software configurations, or both to implement the functions described.

FIG. 1 shows a simplified block diagram of an information processing system 100 within which methods and systems for controlling access to backup copies from an application host 105 to facilitate secure data recovery management may be implemented. In the example of FIG. 1, the application host is connected via a network 110 to a data protection appliance 115. The data protection appliance may be located in, for example, a data center of an organization and provides a backup target for the various application hosts of the organization.

The application host may be referred to as an application server and is managed by an application server administrator 118. The application host may be a physical host or a virtual host and includes an operating system (OS) such as a Windows operating system or Linux-based operating system. The application host provides an environment for running and managing one or more applications. The application may be referred to as an asset 120. The asset is protected by the data protection appliance. Specifically, the application host includes a desktop application 122 and a data protection agent or service 125, along with the asset. In an embodiment, the desktop application includes a backup tool or utility that backs up the asset to and restores the asset from the data protection appliance.

The data protection agent is positioned between the desktop application and the data protection appliance and, upon registering with the data protection appliance, handles communications and requests between the desktop application and data protection appliance during backup and restoration workflows and operations. Communications may be exchanged between the agent and appliance via a Representational State Transfer Application Programming Interface (REST API). The desktop application provides an interface (e.g., graphical user interface (GUI)) through which a user 130 can direct backups of the asset to the data protection appliance, access and restore backups of the asset from the data protection appliance to the same or different application host, or both. The user may be, for example, a developer, quality assurance engineer, or other employee of an organization. These actions may be referred to as "self-service" because the user is able to independently access and manage the backup and restoration workflows without requiring direct assistance from information technology (IT) administrators or other support personnel.

Some examples of assets that may be protected include databases such as an Oracle Database as provided by Oracle Corporation of Austin, Texas; Microsoft SQL Server as provided by Microsoft Corporation of Redmond, Washington; and so forth. While FIG. 1 shows a single application host, it should be appreciated that there can be any number of application hosts hosting any number of assets that may be protected by the data protection appliance.

The application server administrator is responsible for, among other things, managing the application host including server hardware and software, deploying and configuring the asset, and creating and managing user accounts and permissions that enable users to log into the application host and access the asset.

The data protection appliance is responsible for storing and maintaining backup copies of the asset. The data protection appliance may include a management console 133, an identity access management (IAM) service 135, access policy database or repository 140 holding access policies, deduplication filesystem 145 to manage and organize the backup data, and storage 150 that stores the backup data. The storage may include storage devices such as hard disk drives (HDDs), solid state drives (SSDs), or both.

The filesystem provides a way to organize data stored in the appliance and present that data to clients and applications in a logical format. The filesystem organizes the data into files and folders into which the files may be stored. When a client requests access to a file, the filesystem issues a file handle or other identifier for the file to the client. The client can use the file handle or other identifier in subsequent operations involving the file. A namespace of the filesystem provides a hierarchical organizational structure for identifying filesystem objects through a file path. A file can be identified by its path through a structure of folders and subfolders in the filesystem. A filesystem may hold many hundreds of thousands or even many millions of files across many different folders and subfolders and spanning thousands of terabytes. In an embodiment, the filesystem may be divided into two or more logical partitions. A logical partition may be referred to as an mtree. Mtrees may be identified by a unique name and provide further flexibility in organizing and managing data within the filesystem.

In an embodiment, backup copies 151 of the assets are stored in a storage unit 152. The backup copies may be stored in a format different from their native formats. For example, the backup copies may be stored in a compressed format, deduplicated format, or both. The storage unit is a logical container to group data or backup sets including any number of files, directories, volumes, or objects associated with the assets that are being protected by the appliance. A storage unit may map to a specific mtree. In an embodiment, a storage unit corresponds to a directory within the filesystem of the appliance. A storage unit forms a logical partition of the filesystem and may be used as a backup target to store backups of assets. A single storage unit may contain, hold, or store backup copies for different assets. For example, a storage unit may store backup copies of a first asset and backup copies of a second asset, different from the first asset. A storage unit may be associated with a user account that is used to access and manage the storage unit. The user account may include attributes including a user authorized to access the storage unit, password to secure access to the storage unit, name or other identifier for the storage unit, optional storage quotas or limits specifying an amount of data that may be written to the storage unit, other attributes, or combinations of these.

The storage may include data 155 forming the actual backup data content and metadata 160 that facilitates organization, storage, and retrieval of deduplicated data content via filesystem protocols. In particular, the metadata may include a namespace 165 and fingerprints 170, among other data structures. In an embodiment, the namespace is held in a tree structure and, more specifically, a Btree. The fingerprints correspond to unique hash values calculated from the data segments and may be stored in a fingerprint index. Further discussion is provided below.

An example of a data protection appliance is the Dell PowerProtect Data Manager Appliance (DM5500) as provided by Dell Technologies, Inc. of Round Rock, Texas. The DM5500 appliance serves as a comprehensive backup solution, offering customers a centralized platform to manage protected assets securely. It eliminates the need for additional hardware or software to manage backup copies by securely storing them within the appliance itself. Some embodiments are described in conjunction with the DM5500 appliance and other products provided by Dell Technologies. It should be appreciated, however, that principles and aspects discussed can be applied to other data protection or backup storage systems and appliances.

Figure 2:
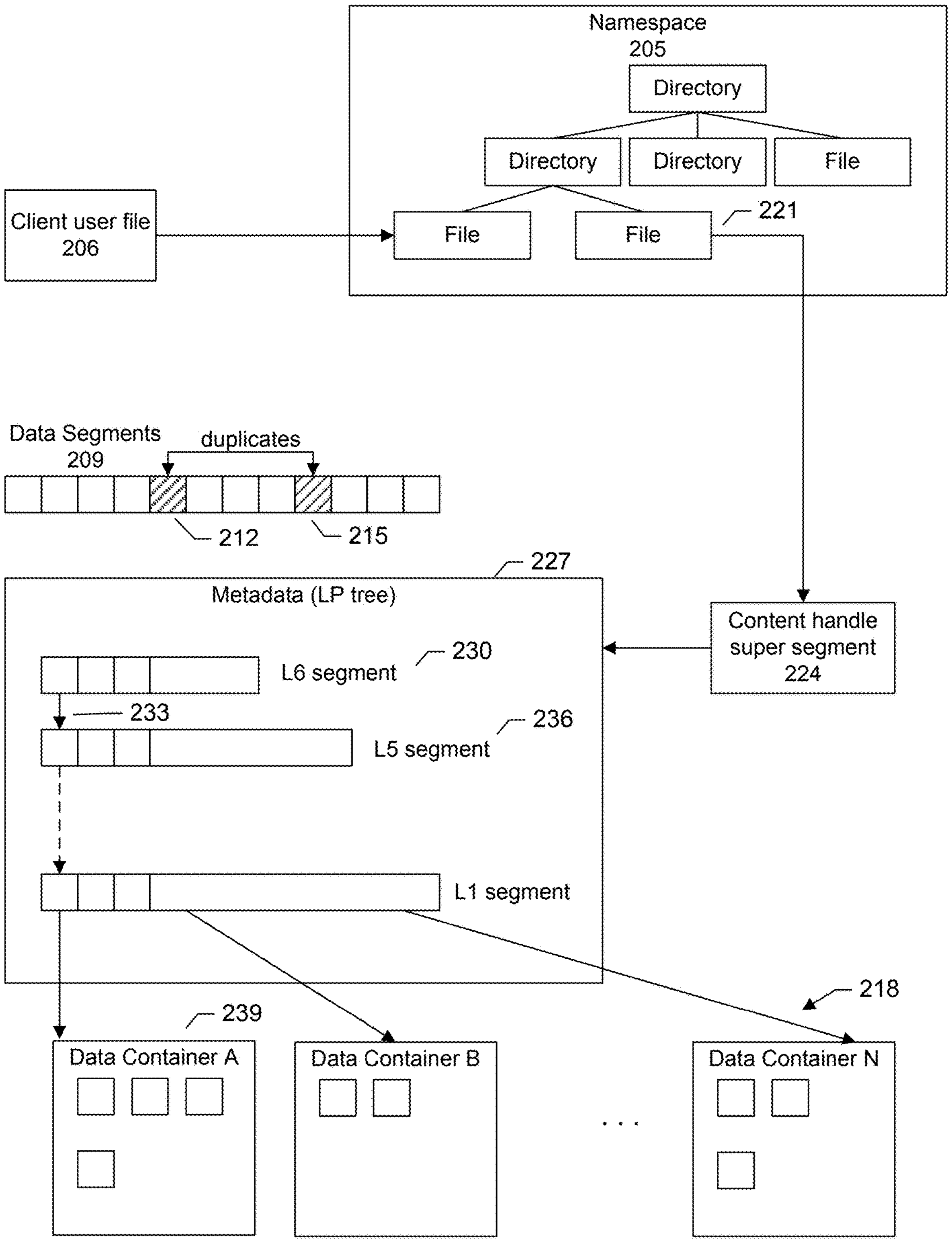
FIG. 2 shows an example of a deduplication process, according to one or more embodiments.

FIG. 2 shows a block diagram illustrating a deduplication process of the filesystem according to one or more embodiments. A deduplicated filesystem is a type of filesystem that can reduce the amount of redundant data that is stored. As shown in the example of FIG. 2, the filesystem maintains a namespace 205. Further details of a filesystem namespace are provided in FIG. 3 and the discussion accompanying FIG. 3.

The process of backing up a file to the filesystem may be referred to as ingest. More particularly, as data, such as incoming client user file 206, enters the filesystem, it is segmented into data segments 209 and filtered against existing segments to remove duplicates (e.g., duplicate segments 212, 215). A segment that happens to be the same as another segment that is already stored in the filesystem may not be again stored. This helps to eliminate redundant data and conserve storage space. Metadata, however, is generated and stored that allows the filesystem to reconstruct or reassemble the file using the already or previously stored segment. Metadata is different from user data. Metadata may be used to track in the filesystem the location of the user data within a shared storage pool. The amount of metadata may range from about 2 or 4 percent the size of the user data.

More specifically, the filesystem maintains among other metadata structures a fingerprint index. The fingerprint index includes a listing of fingerprints corresponding to data segments already stored to the storage pool. A cryptographic hash function (e.g., Secure Hash Algorithm 1 (SHA1)) is applied to segments of the incoming file to calculate the fingerprints (e.g., SHA1 hash values) for each of the data segments making up the incoming file. The fingerprints are compared to the existing fingerprints in the fingerprint index. Matching fingerprints indicate that corresponding data segments are already stored. Non-matching fingerprints indicate that the corresponding data segments are unique and should be stored.

Unique data segments are packed and stored in fixed size immutable containers 218. There can be many millions of containers tracked by the filesystem. The fingerprint index is updated with the fingerprints corresponding to the newly stored data segments. A content handle 221 of the file is kept in the filesystem's namespace to support the directory hierarchy. The content handle points to a super segment 224 which holds a reference to a top of a segment tree 227 of the file. The super segment points to a top reference 230 that points 233 to metadata 236 and data segments 239.

Thus, in a specific embodiment, each file in the filesystem may be represented by a tree. The tree includes a set of segment levels arranged into a hierarchy (e.g., parent-child). Each upper level of the tree includes one or more pointers or references to a lower level of the tree. A last upper level of the tree points to the actual data segments. Thus, upper level segments store metadata while the lowest level segments are the actual data segments. In an embodiment, a segment in an upper level includes a fingerprint (e.g., metadata) of fingerprints of one or more segments in a next lower level (e.g., child level) that the upper level segment references.

A tree may have any number of levels. The number of levels may depend on factors such as the expected size of files that are to be stored, desired deduplication ratio, available resources, overhead, and so forth. In a specific embodiment, there are seven levels L6 to L0. L6 refers to the top level. L6 may be referred to as a root level. L0 refers to the lowest level. Thus, the upper segment levels (from L6 to L1) are the metadata segments and may be referred to as LPs. That is, the L6 to L1 segments include metadata of their respective child segments. The lowest level segments are the data segments and may be referred to as L0*s* or leaf nodes. In an embodiment, segments in the filesystem are identified by 24 byte keys (or the fingerprint of a segment), including the LP segments. Each LP segment contains references to lower level LP segments.

In an embodiment, a client accessing the filesystem may use a protocol referred to as DDBoost. A DDBoost client-side library may be installed at the clients along with an agent to facilitate communication with the data protection appliance. DDBoost is a system that distributes parts of a deduplication process to the application clients, enabling client-side deduplication for faster, more efficient backup and recovery. In an embodiment, the clients use the DDBoost backup protocol to conduct backups of client data to the data protection appliance, restore the backups from the appliance to the clients, or perform other data protection operations. The DDBoost library exposes application programming interfaces (APIs) to integrate with a Data Domain system using an optimized transport mechanism. These API interfaces exported by the DDBoost library provide mechanisms to access or manipulate the functionality of a Data Domain Filesystem. Embodiments may utilize the DDBoost File System Plug-In (BoostFS), which resides on the application system and presents a standard filesystem mount point to the application. With direct access to a BoostFS mount point, the application can leverage the storage and network efficiencies of the DDBoost protocol for backup and recovery. A client may run any number of different types of protocols as the filesystem supports multiple network protocols for accessing remote centrally stored data (e.g., Network File System (NFS), Common Internet File System (CIFS), Server Message Block (SMB), and others).

Figure 3:
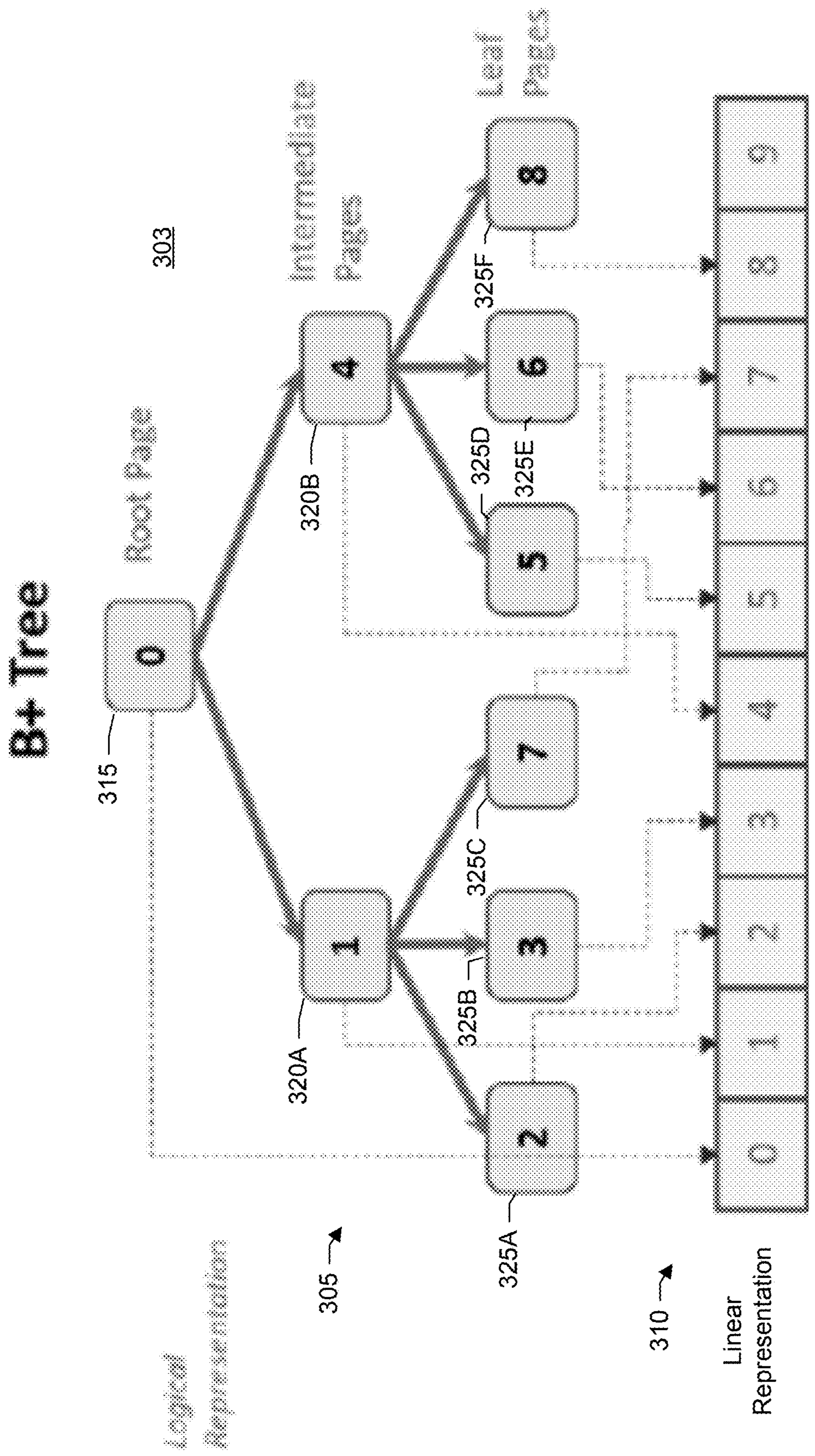
FIG. 3 shows an example of a tree data structure, according to one or more embodiments.

FIG. 3 shows further detail of a namespace of the filesystem. In an embodiment, the namespace is represented by a B+ tree data structure where pages of the tree are written to a key-value store. Page identifiers form the keys of the key-value store and page content form the values of the key-value store. The tree data structure includes the folder and file structure as well as file inodes. FIG. 3 shows an example of a B+ Tree 303 in a logical representation 305 and a linear representation 310. In this example, there is a root page 315, intermediate pages 320A, B, and leaf pages 325A-F. The broken lines shown in FIG. 3 map the pages from their logical representation in the tree to their representation as a linear sequential set of pages on disk, e.g., flattened on-disk layout. In other words, the tree may be represented as a line of pages of data.

The intermediate pages store lookup keys that reference other intermediate or leaf pages. An intermediate page may be referred to as an INT page and references other INT pages or leaf pages by interior keys.

The leaf page contains "key/value" pairs. In an embodiment, a B+ Tree key is a 128-bit number kept in sorted order on the page. It is accompanied by a "value," which is an index to data associated with that key and may be referred to as a "payload." In an embodiment, the 128-bit key includes a 64-bit PID, or parent file ID (the ID of the directory that owns this item), and a 64-bit CID, or child file ID. In an embodiment, the leaf page stores a key for each file in the filesystem. The key references a payload identifying an inode number of the file and thus a pointer to content or data of the file. There can be another key for each file that identifies a name of the file.

Referring back now to FIG. 1, the management console provides a user interface through which the user can log into the data protection appliance to access backup copies of assets for restorations. The identity access management (IAM) service owns the policy decision point (PDP) and handles authorization access to the backup copies based on evaluating the access policies. In particular, there is a data protection appliance administrator 175 that is responsible for implementing and managing data protection and recovery processes of the organization including the management of the data protection appliance. The data protection appliance administrator may be different from the application server administrator (e.g., different person in the organization).

For example, the appliance administrator may be responsible for designing and implementing disaster recovery procedures, helping to ensure swift retrieval of backups in cases of data loss, hardware failures, or as otherwise needed, maintaining the data protection appliance, and defining the access policies. The access policies govern access to the backup copies of the assets. An access policy of an asset may specify which users or user group the policy applies to, level of access granted to a backup copy (e.g., none, view, or restore), type of backup copy to which the access policy applies (e.g., production backup copy versus testing or development backup copy), and so forth.

The data protection appliance thus allows the appliance administrator to develop very granular access control policies over the backup copies. Users may be grouped into specific roles that provide or deny them access to certain backup copies based on, for example, the type of backup copy, asset to which the backup copy relates, and so forth. For example, a user may be granted access to a first type of backup copy of an asset (e.g., testing backup copy of a database), but may not be granted access to a second type of backup copy of the asset (e.g., production backup copy of the database), different from the first type. A first user may be granted access to backup copies of a first asset (e.g., Oracle database). A second user, different from the first user, may be granted access to backup copies of a second asset (e.g., SQL Server database), different from the first asset. The first user may be blocked from accessing the backup copies of the second asset. The second user may be blocked from accessing the backup copies of the first asset. Access control may extend to the application hosts to which a backup copy may be restored. A user may be allowed to restore a backup copy to a first application host, but may be blocked from restoring the backup copy to a second application host, different from the first application host. Access to a backup copy may be defined as permission to view a name of the backup copy, no permission to view the name of the backup copy, permission to restore the backup copy, or no permission to restore the backup copy.

The process of defining roles and types of accesses to the backup copies including backup copy types and related assets may be referred to as scoping. For example, a user having a role of an Oracle administrator may be scoped to see, restore, or access only Oracle related assets. A user having a role of Microsoft SQL administrator may be scooped to see, restore, or access only SQL related assets. Further, scoping may be conducted over types of assets and backup copies. For example, a user may be scoped to see, restore, or access only production related SQL databases. A user may be scoped to see, restore, or access only development and staging related SQL databases. A user not scoped to access a particular asset may be blocked from viewing a name of the particular asset. That is, the name of the particular asset is not displayed to the user. A user not scoped to access a particular type of backup of an asset may be blocked from viewing the particular type of backup of the asset. That is, the name of the particular type of the backup of the asset is not displayed to the user. Thus, the data protection appliance may provide protection for many tens, hundreds, or thousands of databases or other protected assets. But, only the assets that a particular user has access to are made available to display to that particular user.

In an embodiment, the data protection appliance provides flexible restoration options. For example, the user may perform a restoration 180 centrally from the appliance using the management console or perform a restoration 185 directly on the application host using the desktop application. Such a restoration may be performed by remotely logging into the application host such as via a client machine. In other words, administrator users or restore administrators may conduct restores from both centralized and application server locations.

Regardless of which path the user selects to access the backup copies of an asset, it is desirable that the granular access control features of the data protection appliance apply even when the user chooses to bypass logging into the appliance and perform a restoration directly on the application host. An absence of access control for backup copies accessed from application servers presents a security problem. There is a need to control backup copies based on the protected assets the user has access to.

More particularly, in an embodiment, administrators of the appliance have the capability to add users with specific roles, such as backup administrator and restore administrator, granting them limited access to perform operations on protected assets. These users can centrally manage backup and restore operations using the user interface provided by the appliance (e.g., management console). This streamlined approach ensures efficient backup and recovery processes while maintaining security and control over protected assets.

The restore administrator user has the flexibility to perform a data restore either centrally through the appliance management user interface or directly on the application host or server where the database resides, utilizing an agent console installed on the server.

For central restores, the appliance administrator has granular control over access to protected assets. Access can be tailored by defining scopes and restricting operations based on the roles assigned to users, such as backup or restore roles.

In the case of users performing restores directly on the application host or server, access is granted by the application server administrator. The application server or host may not offer the same granular level of control as the data protection appliance. For example, a user upon receiving access to the application host may have access to all assets hosted by the application host. There can be several reasons for this inconsistency. For example, the application host or software of the application host such as an operating system of the application host may not support such a granular level of access control in regards to the backup copies maintained at a different appliance. Nonetheless, upon a user receiving access at the application host, it is desirable to maintain the granular access controls that are enforced from a login via the appliance management user interface so that users do not gain access to all backup copies of assets via the appliance agent console despite a successful login at the application host. In other words, while a successful login by the user to the application host may provide the user with access to all assets on the application host, it is still desirable to be able to control and restrict the backup copies of the assets that are available for access by the user.

There is a need to provide control over backup copies that are accessed directly from a login to the application server by authorizing users through the data protection appliance to which the agent is registered and provide consistent adherence to access control policies that are defined and managed in the identity access management service.

In an embodiment, the user, upon a successful login at the application host, is not prompted or required to make a separate login to data protection appliance in order to access the backup copies maintained at the appliance. Instead, the agent at the host passes the login details provided by the user at the application host to the data protection appliance. The identity access and management service of the appliance uses the login details to determine which backup copies the user does or does not have authorization to access.

Figure 4:
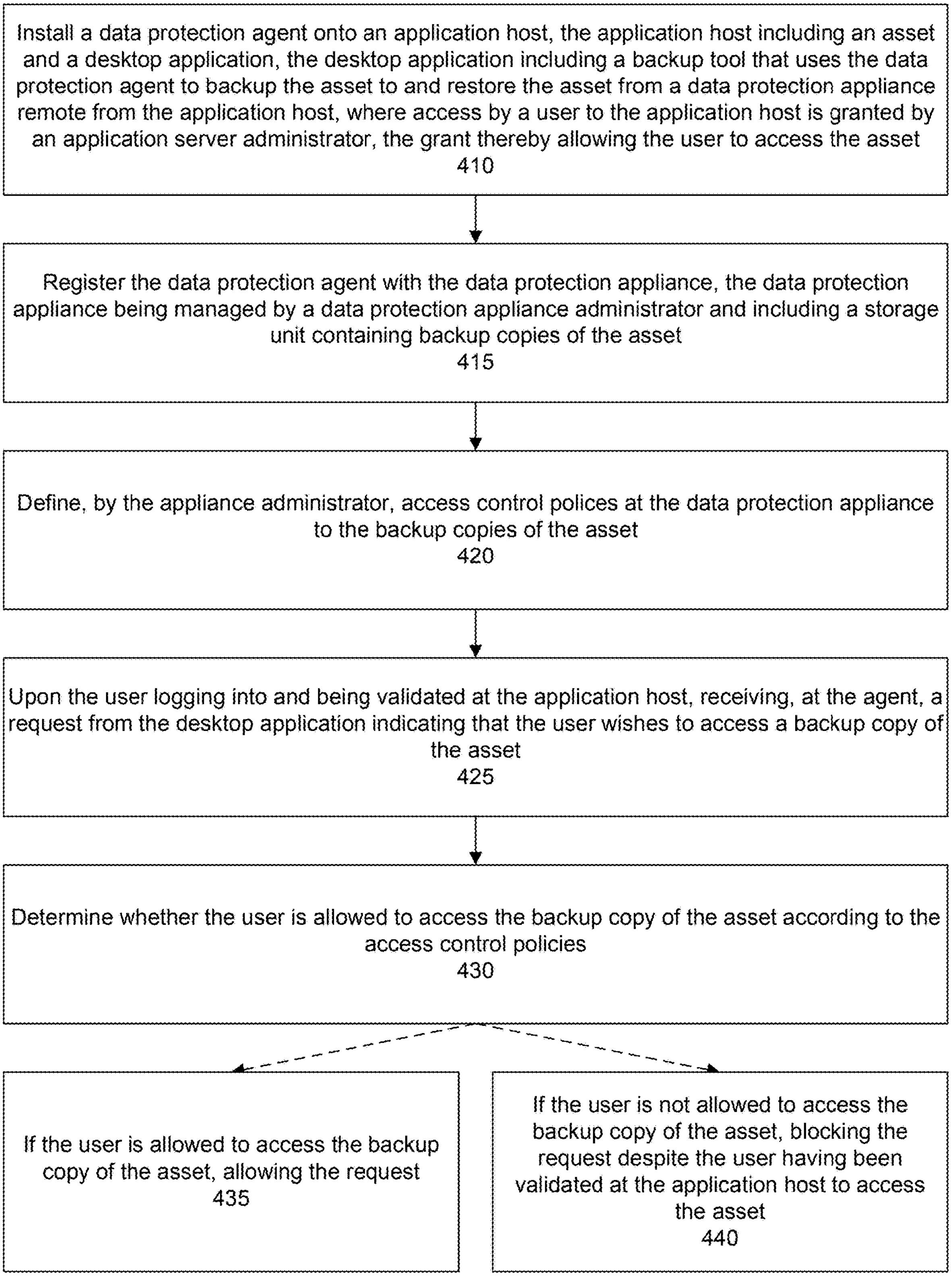
FIG. 4 shows an overall flow for controlled access to backup copies from an application host, according to one or more embodiments.

FIG. 4 shows an overall flow for controlling access to backup copies from an application host. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In brief, in a step 410, a data protection agent is installed onto an application host or server. The application host includes an asset and a desktop application. The desktop application includes a backup tool that uses the data protection agent to backup the asset to and restore the asset from a data protection appliance, remote from the application host. Access by a user to the application host is granted by an application server administrator. The grant allows the user to access the asset on the host.

In a step 415, the data protection agent is registered with the data protection appliance. The data protection appliance is managed by an appliance administrator. The appliance includes a storage unit containing backup copies of the asset.

In a step 420, the appliance administrator defines access control policies at the data protection appliance to the backup copies of the asset.

In a step 425, upon the user logging into and being validated at the application host, the data protection agent receives a request from the desktop application indicating that the user wishes to access a backup copy of the asset.

In a step 430, a determination is made as to whether the user is allowed to access the backup copy of the asset according to the access control policies.

If the user is allowed to access the backup copy of the asset, the request is allowed (step 435). If, however, the user is not allowed to access the backup copy of the asset, the request is blocked—despite the user having been validated at the application host to access the asset.

Figure 5:
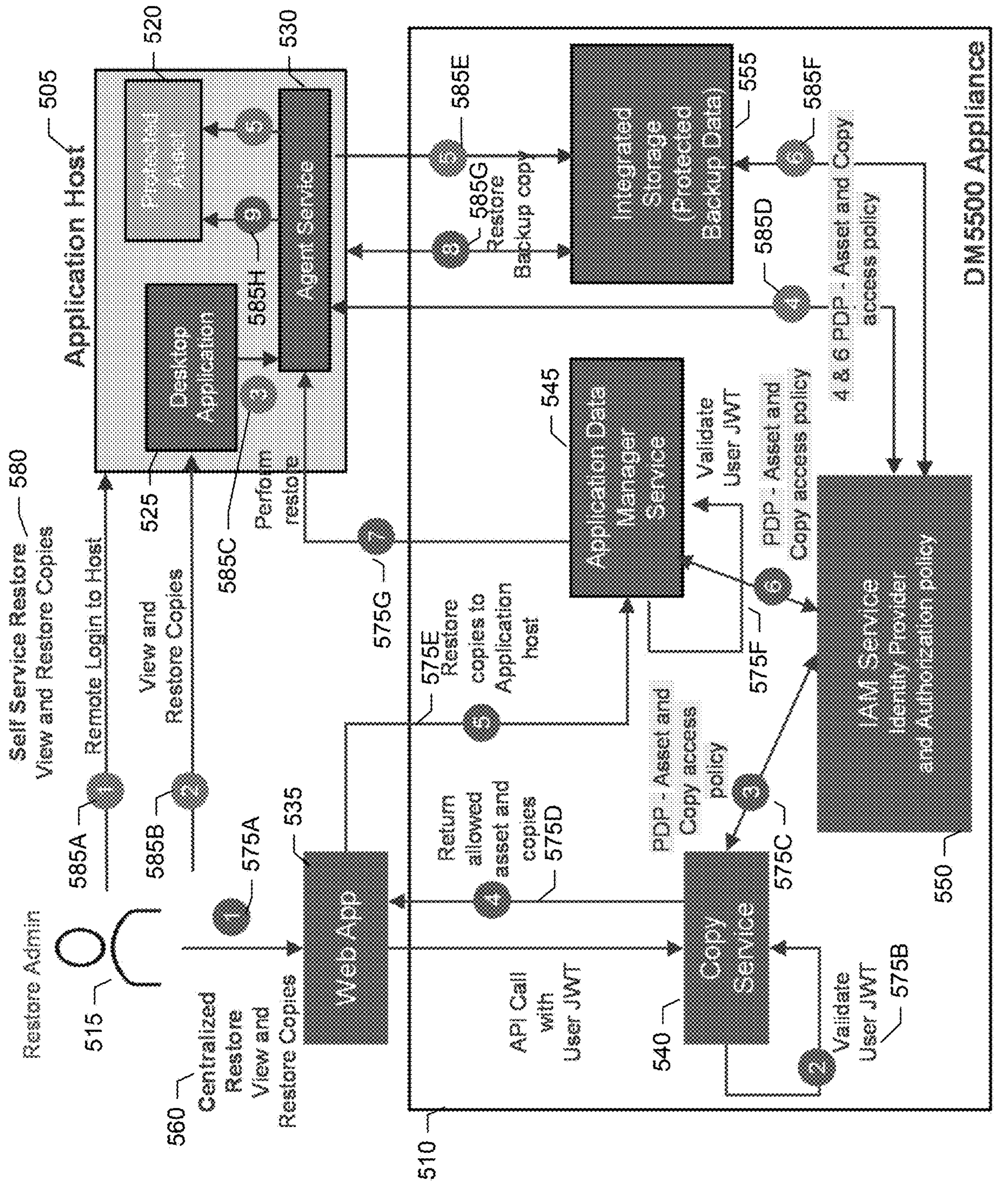
FIG. 5 shows an architectural diagram of an example for controlling access to backup copies from an application host, according to one or more embodiments.

FIG. 5 shows a detailed block diagram of controlling access to backup copies from an application host, according to one or more embodiments. As shown in the example of FIG. 5, there is an application host 505, a data protection appliance 510, and a user 515. The user has been given the role of restore administrator by the data protection appliance administrator.

The application host includes a protected asset 520, desktop application 525, and agent 530. The data protection appliance includes a management user interface accessible by a web application 535, a copy service 540, an application data manager service 545, identity access management (IAM) service 550, and an integrated storage system 555.

The restore administrator can perform a restore of backup copies either via the management user interface (step 560) or through a self-service restore by directly logging into the application host (step 585A). A login authorization process of the application host may be managed by an operating system of the application host (e.g., Windows OS). The option of restoring using the management user interface provided by the appliance may be referred to as a centralized restore. The option of restoring by directly logging into the application host may be referred to as a self-service restore. Systems and techniques are provided to handle the self-service restore, i.e., where the user (e.g., restore administrator) directly logs into the application host and performs a restore of backup copies.

In an embodiment, the management user interface provides the user with a way to view protected assets copies and perform a data restore. When a restore is performed via the management UI, authentication and authorization are handled by the identity access management system. The appliance administrator has granular control and visibility over user access to the protected assets and their copies. The copy service and application data manager (ADM) service validate the user's JSON Web Token or JWT token and authorizes access requests based on the role-based access control (RBAC) and scope set for the user. This authorization is governed by IAM authorization policies.

The copy service and ADM service return only the assets and copies that the user has access to, based on the access policy set for the user. The same authorization process is followed during the restore operation.

In an embodiment, a self-service restore provides another option for the user to view protected assets copies and perform data restore. In the case of a self-service restore, the user authenticates and logs in to the application host to perform the restore using the desktop application provided by the agent service running on the application host. Reliance is placed on the application host or server administrator to grant valid access to the assets running on the host. Based on the privileges and access set by the application host administrator, the restore administrator can view all assets and copies and perform the restore. In an embodiment, systems and techniques are provided to help ensure that self-service restores do not bypass the centralized control and visibility provided by using the management user interface. A decentralized restoration option (i.e., self-service or restore from the application host) can lead to potential security risks and unauthorized access to protected assets, as the application host administrator's controls may accidentally grant elevated access to the user (e.g., restore administrator) and may not be in sync with the policy enforced by IAM system.

In an embodiment, when the user (e.g., restore administrator) attempts to view assets or their backup copies from the desktop application, the agent service automatically connects to the registered data protection appliance to determine the access control policy for the logged-in user. The agent then performs controlled access on assets and copies for the restore operation. More particularly, the policy evaluation is done when user attempts to access a list of assets/asset and when the user is trying to access a list of copies/copy associated to an asset. Thus, even if the user acquires or gets ahold of the asset or copy catalog unique identifier, the authorization service evaluates and consistently allows or denies access to the asset or copies at the catalog and data access level.

Referring now to FIG. 5, a centralized restore 560 may begin with the restoration administrator user accessing (first step 575A) the client web app to connect to the copy service of the data protection appliance. An API call with the user's JWT is issued to the copy service which, in a second step 575B, validates the user's JWT. A JWT is a compact, URL-safe token format used for securely transmitting information between parties. The user provides their credentials, e.g., username and password, to an authentication server of the appliance. The server, upon verifying the username and password, generates and signs a JWT using a key and sends the JWT back to the client. The token includes an expiration time. The client stores the token, e.g., in local storage, and includes the token in subsequent requests to the data protection appliance. The appliance validates the token by checking the signature and that the token has not yet expired.

In a third step 575C, the copy service connects to the IAM service to make a policy decision regarding the assets and copies that the user is allowed to access. Once the IAM service validates the items (e.g., assets, backup copies, or both) to which the user has access, the copy service queries a database or copy catalog to obtain a listing of the items and associated metadata. In a fourth step 575D, the copy service returns a listing of the allowed asset and copies to the client web app. The allowed listing is displayed to the restoration administrator user via the web app (e.g., displayed on an electronic screen). The user can browse the listing and make a selection of the backup copy to restore and the application host to which the backup copy should be restored to. The application host may be the original host from which a backup copy was created or a different alternate host.

In a fifth step 575E, the selection is sent, along with the JWT, from the client web app to the application data manager service. The application data manager service validates the user JWT and in a sixth step 575F also checks again with the IAM service to evaluate the asset and copy access policies. If the policy decision indicates that the user is allowed to restore the selected backup copy, in a seventh step 575G, the application data manager service performs the restoration of the selected copy to the application host.

A self-service restore 580 may begin with the restoration administrator user conducting a login to the application host. The login may be a remote login (first step 585A). Systems and techniques provide for applying the same access and authorization polices used for both centralized restores from the appliance and self-service restores from the application host. In a second step 585B, upon a successful login and validation at the application host, the user launches the desktop application and selects an option within the desktop application to view and restore backup copies. In a third step 585C, the selection or action triggers a request to the agent service to determine a listing of the asset and backup copies that the user is allowed to access.

In a fourth step 585D, the agent service issues a request to the IAM service to conduct an evaluation of the access policies governing access to the asset and backup copies. In other words, despite the user having been successfully validated at the application host, the agent service does not immediately make a request to the integrated storage system, at which the asset backup copies are stored, to retrieve the backup copies. The request is intercepted so that the access policies can be validated. Specifically, the agent service issues a request for access policy evaluation by the IAM service to determine the listing of assets and backup copies that the user to authorized to access. The user is blocked from browsing through names or identifications of assets, backup copies, or both that the user does not have access to according to the access control and authorization policies.

As discussed, the access policies can define access to the backup copies at a very fine level of granularity. For example, a single storage unit of the appliance may contain backup copies of multiple assets and multiple types of backup copies for each asset. That is, there can be backup copies for an Oracle database, backup copies for a SQL Server database, backup copies of the Oracle database, SQL Server database, or both for production purposes (e.g., containing actual customer transactions), backup copies of the Oracle database, SQL Server database, or both for development and testing purposes (e.g., containing fictional customer transactions), and so forth.

The agent makes a request to the IAM service for a listing of the names or identifications of the assets, backup copies, and backup copy types that the user is allowed to access depending upon the access policies defined by the data protection appliance administrator and maintained at the data protection appliance. The listing is then returned to the agent for display to the user via the desktop application at the application host for the user to browse and make a selection. Assets, backup copies, and backup copy types to which the user does not have access to according to the access policies at the data protection appliance are not displayed on the desktop application.

In a fifth step 585E, the agent forwards the user's selection of the backup copy to restore to the integrated storage system. Upon receipt of the selected backup copy to restore, the integrated storage system, however, does not immediately fetch the selected backup copy. Rather, in a sixth step 585F, the integrated storage system requests that the IAM service again make or repeat a policy evaluation as to whether the user is authorized to access the selected backup copy—despite the user already having been logged into and validated at the application host and a previous access policy decision having been made when displaying the list specifying the names of assets, backup copies, and backup copy types at the desktop application (step 585D).

If the IAM service determines, according to the access policies, that the user remains authorized to access the selected backup copy, the IAM service notifies the application data manager service which, in turn, notifies the agent that the restoration of the selected backup copy can continue (step 575G). In an eighth step 585G, the agent upon receipt of the notification from the application data manager service, fetches the selected backup copy of the asset from the integrated storage and restores the backup copy to the application host (step 585H). As discussed, the integrated storage may include a storage unit storing any number of backup copies and backup copy types for any number of assets. However, the policy decisions made from repeatedly checking with the IAM service helps to ensure that the user logged into the application host has access to only a specific subset of the backup copies according to the access policies defined by the appliance administrator.

If, for example, the access policies are changed, modified, or altered between a time that the agent made the initial request to appliance for the listing of backup copies (step 585D) and a time that the user made a selection of a backup copy to restore, the IAM check requested by the integrated storage component detects the change and, if appropriate, blocks or denies the retrieval of the selected backup copy in step 585E. The operations to repeatedly check with the IAM service for policy evaluation provides a higher degree of security than merely having token or JWT-based authentication where the token is static and remains valid until the token expires, the user ends the user session by logging out, or an action is taken to inactivate the user session. Changes when relying solely on JWT or token-based authentication may take effect only upon a subsequent login when the token is refreshed with a new set of privileges (or revocations of privileges).

Systems and techniques can limit the backup copies that the user can see or view at the application host despite having been validated by the application host. That is, a name or identification of a backup copy or backup copy type of an asset that the user is not permitted to access or view is not displayed at the application desktop. Further, even if the user is determined to have access to the backup copy and, thus the name of the backup copy is displayed at the application desktop, if the access control policies are suddenly changed to revoke access, the changes are effective immediately. The user does not have to logout and log back into the application host for the changes to take effect. Even if the user selects the displayed name or identification of the backup copy to restore, another check of the access policies is made at the time the backup copy is to be retrieved from storage. If the other check now indicates that the user no longer has access to the backup copy, the restoration is blocked despite the user having remained logged into the application host and providing a valid identification of the backup copy to restore.

In an embodiment, a method includes: upon a user being validated at an application host hosting an asset, determining at a data protection appliance storing backup copies of the asset whether the user has access to the backup copies according to access control policies at the data protection appliance; making a first determination that the user has access to the backup copies; displaying, at the application host, a listing of names identifying the backup copies to which the user has access; receiving a selection from the user of a backup copy to restore to the application host; determining whether the user has access to the selected backup copy; and making a second determination that the user now does not have access to the selected backup copy according to the access control policies, the access control policies have been changed between the first and second determinations.

In an embodiment, the data protection appliance includes, for an agent installed at an application host, a control or management path and a data path. The control or management path carries communications and instructions for managing, coordinating, and orchestrating operations among components including carrying metadata (e.g., listing, names, or other identifications of backup copies and backup copy types). The control path does not process or carry the actual data of the backup copies. Instead, the actual data of the backup copies is carried by the data path. Both the control path and the data path, however, include checks with the IAM service to determine or evaluate in real-time or near real-time whether a user's access to the backup copies remains valid. Thus, a first event along the control path may indicate that a user has access to a backup copy and a name or other metadata of the backup copy may be displayed to the user. A second event, after the first event, along the data path may indicate that the user no longer has access to the backup copy. Based on the second event, data of the backup copy is blocked from transmission over the data path. The data protection appliance provides control over both the control or management path and the data path for the application host.

Systems and techniques provide for attribute-based access control, consistent with enforcement done in a centralized environment to the application host (self-service) restore and may be applied for other types of customer integration to access backup copies. Further, rather than carrying control information through a token (used for authentication), systems and techniques disclosed are independent of the authentication method and access policy is evaluated at the time of access.

Any access policy changes made by the data protection appliance administrator are immediately effective for both centralized and self-service restores. With centralized authorization performed by the agent service, administrators can also be notified if a user is granted incorrect or elevated privileges to access protected assets and copies. The described systems and techniques effectively addresses the security concerns and offers a scalable solution that can be extended to various deployment scenarios. For instance, the model can be adapted to accommodate on-premises deployments where a data protection appliance is managed from a Software as a Service (SaaS) application running in the cloud. In this setup, policies can be centrally managed and pushed to the on-premises backup appliance, ensuring consistency and enforcement across the infrastructure.

Generally, the administrator of the application server is tasked with manually granting access to users by providing access to the application server itself. Once access is granted, users gain entry to all assets hosted on the appliance. In an embodiment, the application agent console provides access to all the files associated with the configured storage units, as the agent uses the service account (e.g., configured DDBoost user credentials) to access the storage unit.

Access is limited to the user used for authentication (Boost) or to the host defined in the export configuration (NFS). Existing techniques to limit access do not offer the granular controls described. Token-based authentication (e.g., JWT or other proprietary token-based authentication) for more granular control (e.g., specific assets within a storage unit or mtree) do not allow for dynamically enforcing access policy changes made during a user session once the user has been authenticated. An advantage to the systems and techniques described is that they operate or work independent of the authentication method and are dynamic in nature such that any changes applied to the user are immediately effective, i.e., without requiring expiration of the user session.

Consider, as an example, that User X, User Y, and User Z are restore administrators on the application server, and they all have equal access to the files stored in the storage unit, thereby obtaining access to all backup copies associated with these assets. It is desirable to support further scoping of assets and copies stored in the same storage unit or Mtree, such as User X having access to only backup copies associated with Asset_1, User Y having access to only backup copies associated with Asset_2, and User Z having access to both Asset_1 and Asset_2 to perform restores. Relying on an authentication token results in the access to the assets and copies remaining valid until the session has expired. So, if there are any changes made to the access policy, the changes are only reflected after a new authentication is performed whereas with granular access control the changes are effective immediately.

The limitation of token-based authentication means that administrators must either grant access to all assets and backup copies stored in the storage unit or mtree or create additional storage unit/mtree to scope assets and copies or impose restricted permissions on the restore function within the appliance server. However, these approaches present challenges:

Accidental elevation of privileges: Administrators may inadvertently provide elevated privileges to restore administrators, leading to security breaches.

Lack of oversight: Administrators are required to constantly monitor operations performed by the restoration administrators to ensure compliance and security.

Overprovisioning access: Alternatively, administrators may need to provide access to all protected assets, potentially exposing sensitive data to unauthorized users.

To mitigate these risks, a more robust access control mechanism is required, ensuring that only authorized users have access to backup copies while maintaining security and compliance standards. The systems and techniques disclosed can help organizations to streamline data recovery processes, enhance security measures, and provide consistent control policies, whether restoring from the backup product or conducting direct restores on application servers.

In an embodiment, a method includes: installing a data protection agent onto a first application host, the first application host comprising a first asset, and a desktop application comprising a backup tool that uses the data protection agent to backup the first asset to and restore the first asset from a data protection appliance that is remote from the first application host, wherein access by a user to the application host is granted by an application server administrator, the grant thereby allowing the user to access the first asset; registering the data protection agent with the data protection appliance, the data protection appliance being managed by a backup administrator and comprising a storage unit containing backup copies of the first asset; defining, by the backup administrator, access control policies at the data protection appliance to the backup copies of the first asset; upon the user logging into and being validated at the first application host, receiving, at the agent, a request from the desktop application indicating that the user wishes to access a backup copy of the first asset; determining whether the user is allowed to access the backup copy of the first asset according to the access control policies; and if the user is not allowed to access the backup copy of the first asset according to the access control polices, blocking the request despite the user having been validated at the first application host to access the first asset.

In an embodiment, the storage unit comprises backup copies of the first asset that are of a first type, backup copies of the first asset that are of a second type, different from the first type, and the method further comprises: determining that the request is to access one of the first type of backup copy or the second type of backup copy; if the access control policies specify that the user is not allowed to access the one of the first type of backup copy or the second type of backup copy, blocking the request; and if the access control policies specify that the user is allowed to access the one of the first type of backup copy or the second type of backup copy, allowing the request.

In an embodiment, the storage unit comprises backup copies of a second asset, different from the first asset, the second asset being hosted by a second application host to which the application server administrator has granted the user access, and the method further comprises: determining from the access control policies that the user is not allowed to access the backup copies of the second asset; and not displaying on the desktop application the backup copies of the second asset to the user despite the application server administrator having granted the user access to the second application host hosting the second asset.

In an embodiment, the first application host hosts a second asset, the user thereby having access to the second asset because the user has been granted access to the first application host by the application server administrator, and the method further comprises: determining from the access control policies that the user is not allowed to access the backup copies of the second asset; and not displaying on the desktop application the backup copies of the second asset to the user despite the application server administrator having granted the user access to the first application host hosting the second asset.

In an embodiment, the method further comprises: while the user remains logged in and validated by the first application host, evaluating the access control policies each time the user attempts to view the backup copies of the first asset from the desktop application; and evaluating the access control policies each time the user attempts to restore the backup copies of the first asset from the desktop application.

The method may include determining that the user is allowed to access the backup copy of the first asset and displaying a name of the backup copy at the desktop application at the application host; receiving a selection of the name indicating that the user wishes to restore the backup copy; issuing another request to the data protection application to check whether the user still has access to the backup copy; and repeating the determining whether the user is allowed to access the backup copy of the first asset according to the access control policies.

In another embodiment, there is a system comprising: a processor; and memory configured to store one or more sequences of instructions which, when executed by the processor, cause the processor to carry out the steps of: installing a data protection agent onto a first application host, the first application host comprising a first asset, and a desktop application comprising a backup tool that uses the data protection agent to backup the first asset to and restore the first asset from a data protection appliance that is remote from the first application host, wherein access by a user to the application host is granted by an application server administrator, the grant thereby allowing the user to access the first asset; registering the data protection agent with the data protection appliance, the data protection appliance being managed by a backup administrator and comprising a storage unit containing backup copies of the first asset; defining, by the backup administrator, access control policies at the data protection appliance to the backup copies of the first asset; upon the user logging into and being validated at the first application host, receiving, at the agent, a request from the desktop application indicating that the user wishes to access a backup copy of the first asset; determining whether the user is allowed to access the backup copy of the first asset according to the access control policies; and if the user is not allowed to access the backup copy of the first asset according to the access control polices, blocking the request despite the user having been validated at the first application host to access the first asset.

In another embodiment, there is a computer program product, comprising a non-transitory computer-readable medium having a computer-readable program code embodied therein, the computer-readable program code adapted to be executed by one or more processors to implement a method comprising: installing a data protection agent onto a first application host, the first application host comprising a first asset, and a desktop application comprising a backup tool that uses the data protection agent to backup the first asset to and restore the first asset from a data protection appliance that is remote from the first application host, wherein access by a user to the application host is granted by an application server administrator, the grant thereby allowing the user to access the first asset; registering the data protection agent with the data protection appliance, the data protection appliance being managed by a backup administrator and comprising a storage unit containing backup copies of the first asset; defining, by the backup administrator, access control policies at the data protection appliance to the backup copies of the first asset; upon the user logging into and being validated at the first application host, receiving, at the agent, a request from the desktop application indicating that the user wishes to access a backup copy of the first asset; determining whether the user is allowed to access the backup copy of the first asset according to the access control policies; and if the user is not allowed to access the backup copy of the first asset according to the access control polices, blocking the request despite the user having been validated at the first application host to access the first asset.

Figure 6:
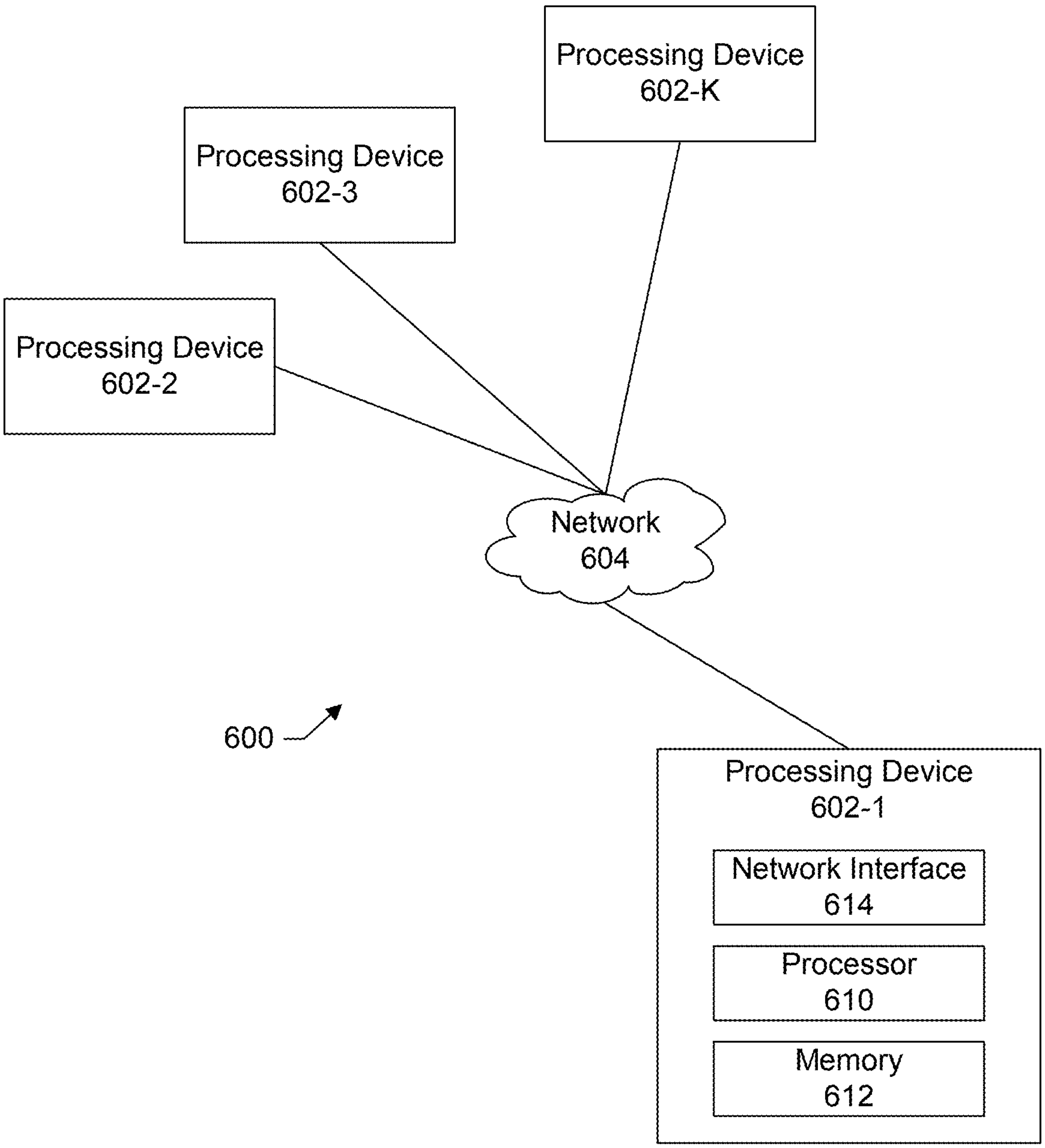
FIG. 6 shows a block diagram of a processing platform that may be utilized to implement at least a portion of an information processing system, according to one or more embodiments.

FIG. 6 shows an example of a processing platform 600 that may include at least a portion of the information handling system shown in FIG. 1. The example shown in FIG. 6 includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 7:
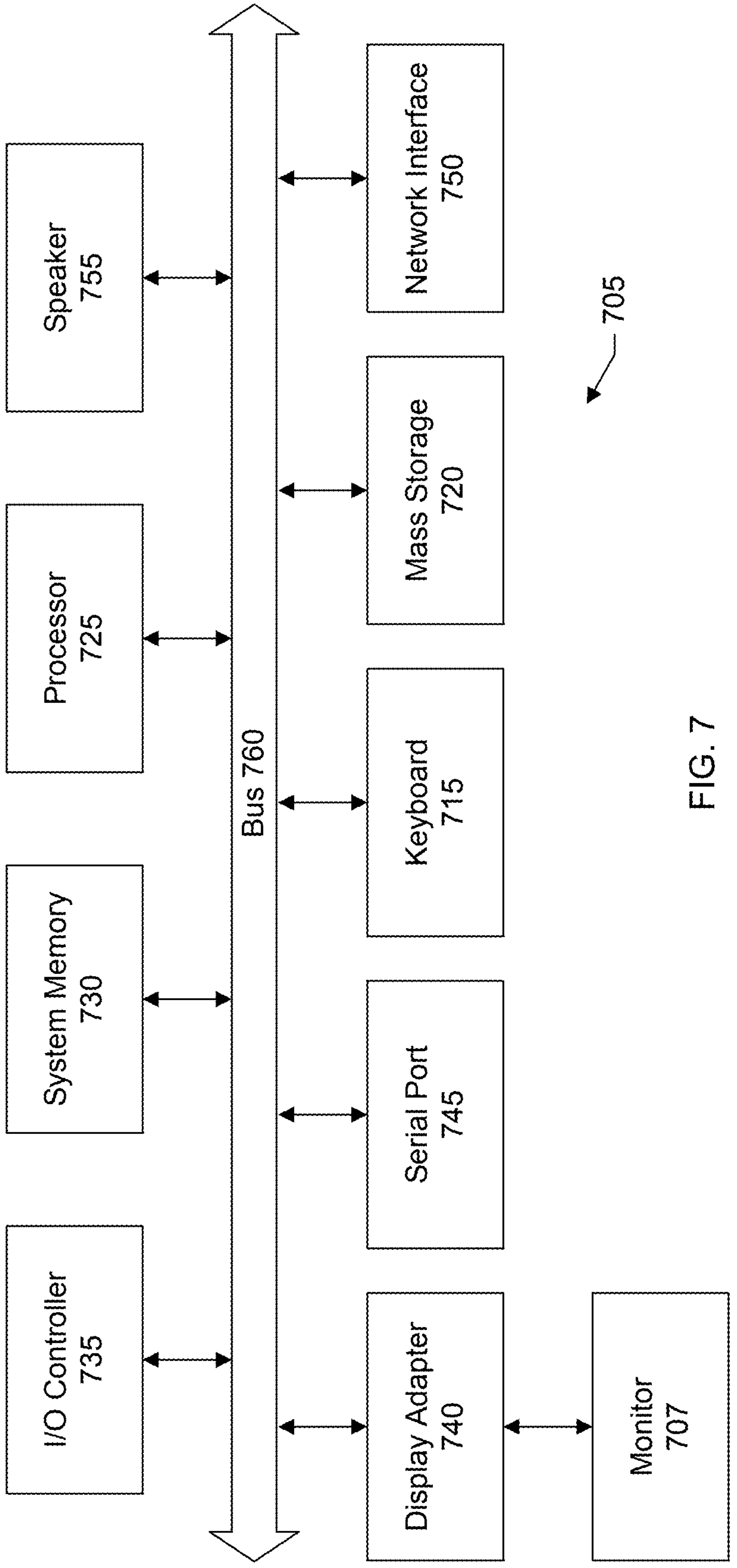
FIG. 7 shows a block diagram of a computer system suitable for use with the system, according to one or more embodiments.

FIG. 7 shows a system block diagram of a computer system 705 used to execute the software of the present system described herein. The computer system includes a monitor 707, keyboard 715, and mass storage devices 720. Computer system 705 further includes subsystems such as central processor 725, system memory 730, input/output (I/O) controller 735, display adapter 740, serial or universal serial bus (USB) port 745, network interface 750, and speaker 755. The system may also be used with computer systems with additional or fewer subsystems. For example, a computer system could include more than one processor 725 (i.e., a multiprocessor system) or a system may include a cache memory.

Arrows such as 760 represent the system bus architecture of computer system 705. However, these arrows are illustrative of any interconnection scheme serving to link the subsystems. For example, speaker 755 could be connected to the other subsystems through a port or have an internal direct connection to central processor 725. The processor may include multiple processors or a multicore processor, which may permit parallel processing of information. Computer system 705 shown in FIG. 7 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

The clients may include servers, desktop computers, laptops, tablets, smartphones, internet of things (IoT) devices, or combinations of these. The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The storage system may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays, shared storage pool, or an object or cloud storage service. In an embodiment, storage (e.g., tape or disk array) may represent any practical storage device or set of devices, such as tape libraries, virtual tape libraries (VTL), fiber-channel (FC) storage area network devices, and OST (OpenStorage) devices. The storage may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. Thus, storage may represent logical storage that includes any number of physical storage devices connected to form a logical storage.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:

installing a data protection agent onto a first application host, the first application host comprising a first asset, and a desktop application comprising a backup tool that uses the data protection agent to backup the first asset to and restore the first asset from a data protection appliance, wherein access by a user to the application host is granted by an application server administrator, the grant thereby allowing the user to access the first asset;

registering the data protection agent with the data protection appliance, the data protection appliance being managed by a backup administrator and comprising a storage unit containing backup copies of the first asset;

defining, by the backup administrator, access control policies at the data protection appliance to the backup copies of the first asset;

upon the user logging into and being validated at the first application host, receiving, at the agent, a request from the desktop application indicating that the user wishes to access a backup copy of the first asset;

determining whether the user is allowed to access the backup copy of the first asset according to the access control policies; and if the user is not allowed to access the backup copy of the first asset according to the access control polices, blocking the request despite the user having been validated at the first application host to access the first asset.

2. The method of claim 1 wherein the storage unit comprises backup copies of the first asset that are of a first type, backup copies of the first asset that are of a second type, different from the first type, and the method further comprises:

determining that the request is to access one of the first type of backup copy or the second type of backup copy;

if the access control policies specify that the user is not allowed to access the one of the first type of backup copy or the second type of backup copy, blocking the request; and if the access control policies specify that the user is allowed to access the one of the first type of backup copy or the second type of backup copy, allowing the request.

3. The method of claim 1 wherein the storage unit comprises backup copies of a second asset, different from the first asset, the second asset being hosted by a second application host to which the application server administrator has granted the user access, and the method further comprises:

determining from the access control policies that the user is not allowed to access the backup copies of the second asset; and not displaying on the desktop application the backup copies of the second asset to the user despite the application server administrator having granted the user access to the second application host hosting the second asset.

4. The method of claim 1 wherein the first application host hosts a second asset, the user thereby having access to the second asset because the user has been granted access to the first application host by the application server administrator, and the method further comprises:

determining from the access control policies that the user is not allowed to access the backup copies of the second asset; and not displaying on the desktop application the backup copies of the second asset to the user despite the application server administrator having granted the user access to the first application host hosting the second asset.

5. The method of claim 1 further comprising:

while the user remains logged in and validated by the first application host, evaluating the access control policies each time the user attempts to view the backup copies of the first asset from the desktop application; and evaluating the access control policies each time the user attempts to restore the backup copies of the first asset from the desktop application.

6. The method of claim 1 further comprising:

determining that the user is allowed to access the backup copy of the first asset and displaying a name of the backup copy at the desktop application at the application host;

receiving a selection of the name indicating that the user wishes to restore the backup copy;

issuing another request to the data protection application to check whether the user still has access to the backup copy; and repeating the determining whether the user is allowed to access the backup copy of the first asset according to the access control policies.

7. A system comprising: a processor; and memory configured to store one or more sequences of instructions which, when executed by the processor, cause the processor to carry out the steps of:

installing a data protection agent onto a first application host, the first application host comprising a first asset, and a desktop application comprising a backup tool that uses the data protection agent to backup the first asset to and restore the first asset from a data protection appliance, wherein access by a user to the application host is granted by an application server administrator, the grant thereby allowing the user to access the first asset;

registering the data protection agent with the data protection appliance, the data protection appliance being managed by a backup administrator and comprising a storage unit containing backup copies of the first asset;

defining, by the backup administrator, access control policies at the data protection appliance to the backup copies of the first asset;

upon the user logging into and being validated at the first application host, receiving, at the agent, a request from the desktop application indicating that the user wishes to access a backup copy of the first asset;

determining whether the user is allowed to access the backup copy of the first asset according to the access control policies; and if the user is not allowed to access the backup copy of the first asset according to the access control polices, blocking the request despite the user having been validated at the first application host to access the first asset.

8. The system of claim 7 wherein the storage unit comprises backup copies of the first asset that are of a first type, backup copies of the first asset that are of a second type, different from the first type, and the processor further carries out the steps of:

determining that the request is to access one of the first type of backup copy or the second type of backup copy;

if the access control policies specify that the user is not allowed to access the one of the first type of backup copy or the second type of backup copy, blocking the request; and if the access control policies specify that the user is allowed to access the one of the first type of backup copy or the second type of backup copy, allowing the request.

9. The system of claim 7 wherein the storage unit comprises backup copies of a second asset, different from the first asset, the second asset being hosted by a second application host to which the application server administrator has granted the user access, and the processor further carries out the steps of:

determining from the access control policies that the user is not allowed to access the backup copies of the second asset; and not displaying on the desktop application the backup copies of the second asset to the user despite the application server administrator having granted the user access to the second application host hosting the second asset.

10. The system of claim 7 wherein the first application host hosts a second asset, the user thereby having access to the second asset because the user has been granted access to the first application host by the application server administrator, and the processor further carries out the steps of:

determining from the access control policies that the user is not allowed to access the backup copies of the second asset; and not displaying on the desktop application the backup copies of the second asset to the user despite the application server administrator having granted the user access to the first application host hosting the second asset.

11. The system of claim 7 wherein the processor further carries out the steps of:

while the user remains logged in and validated by the first application host, evaluating the access control policies each time the user attempts to view the backup copies of the first asset from the desktop application; and evaluating the access control policies each time the user attempts to restore the backup copies of the first asset from the desktop application.

12. The system of claim 7 wherein the processor further carries out the steps of:

determining that the user is allowed to access the backup copy of the first asset and displaying a name of the backup copy at the desktop application at the application host;

receiving a selection of the name indicating that the user wishes to restore the backup copy;

issuing another request to the data protection application to check whether the user still has access to the backup copy; and repeating the determining whether the user is allowed to access the backup copy of the first asset according to the access control policies.

13. A computer program product, comprising a non-transitory computer-readable medium having a computer-readable program code embodied therein, the computer-readable program code adapted to be executed by one or more processors to implement a method comprising:

installing a data protection agent onto a first application host, the first application host comprising a first asset, and a desktop application comprising a backup tool that uses the data protection agent to backup the first asset to and restore the first asset from a data protection appliance, wherein access by a user to the application host is granted by an application server administrator, the grant thereby allowing the user to access the first asset;

registering the data protection agent with the data protection appliance, the data protection appliance being managed by a backup administrator and comprising a storage unit containing backup copies of the first asset;

defining, by the backup administrator, access control policies at the data protection appliance to the backup copies of the first asset;

upon the user logging into and being validated at the first application host, receiving, at the agent, a request from the desktop application indicating that the user wishes to access a backup copy of the first asset;

determining whether the user is allowed to access the backup copy of the first asset according to the access control policies; and if the user is not allowed to access the backup copy of the first asset according to the access control polices, blocking the request despite the user having been validated at the first application host to access the first asset.

14. The computer program product of claim 13 wherein the storage unit comprises backup copies of the first asset that are of a first type, backup copies of the first asset that are of a second type, different from the first type, and the method further comprises:

determining that the request is to access one of the first type of backup copy or the second type of backup copy;

if the access control policies specify that the user is not allowed to access the one of the first type of backup copy or the second type of backup copy, blocking the request; and if the access control policies specify that the user is allowed to access the one of the first type of backup copy or the second type of backup copy, allowing the request.

15. The computer program product of claim 13 wherein the storage unit comprises backup copies of a second asset, different from the first asset, the second asset being hosted by a second application host to which the application server administrator has granted the user access, and the method further comprises:

determining from the access control policies that the user is not allowed to access the backup copies of the second asset; and not displaying on the desktop application the backup copies of the second asset to the user despite the application server administrator having granted the user access to the second application host hosting the second asset.

16. The computer program product of claim 13 wherein the first application host hosts a second asset, the user thereby having access to the second asset because the user has been granted access to the first application host by the application server administrator, and the method further comprises:

determining from the access control policies that the user is not allowed to access the backup copies of the second asset; and not displaying on the desktop application the backup copies of the second asset to the user despite the application server administrator having granted the user access to the first application host hosting the second asset.

17. The computer program product of claim 13 wherein the method further comprises:

while the user remains logged in and validated by the first application host, evaluating the access control policies each time the user attempts to view the backup copies of the first asset from the desktop application; and evaluating the access control policies each time the user attempts to restore the backup copies of the first asset from the desktop application.

18. The computer program product of claim 13 wherein the method further comprises:

determining that the user is allowed to access the backup copy of the first asset and displaying a name of the backup copy at the desktop application at the application host;

receiving a selection of the name indicating that the user wishes to restore the backup copy;

issuing another request to the data protection application to check whether the user still has access to the backup copy; and repeating the determining whether the user is allowed to access the backup copy of the first asset according to the access control policies.

* * * * *